(12) United States Patent
Dumpeti et al.

(10) Patent No.: US 8,601,377 B2
(45) Date of Patent: Dec. 3, 2013

(54) SYSTEM AND METHOD FOR MAINTAINING CONTEXT SENSITIVE USER GROUPS

(75) Inventors: Vishweshwar Rao Dumpeti, Miami, FL (US); Christopher Patrick Moeller, San Francisco, CA (US); Sean Lyden, Hermosa Beach, CA (US); Maria Isabel Figueroa, Coral Gables, FL (US); Enrique R. Domenech, Miami, FL (US); Santiago Gamboa, Miami, FL (US)

(73) Assignee: Yahoo! Inc., Sunnyvale, CA (US)

( * ) Notice: Subject to any disclaimer, the term of this patent is extended or adjusted under 35 U.S.C. 154(b) by 406 days.

(21) Appl. No.: 12/247,980

(22) Filed: Oct. 8, 2008

(65) Prior Publication Data

US 2010/0088607 A1    Apr. 8, 2010

(51) Int. Cl.
*G06F 3/00* (2006.01)

(52) U.S. Cl.
USPC ............................ 715/751; 715/707; 715/748

(58) Field of Classification Search
USPC ................. 715/739, 705–709, 751–759, 748; 709/205–206, 219–220, 224, 219–222; 345/473
See application file for complete search history.

(56) References Cited

U.S. PATENT DOCUMENTS

| | | | |
|---|---|---|---|
| 7,444,379 B2 | 10/2008 | Becker et al. | |
| 7,454,709 B1 | 11/2008 | Appelman | |
| 7,499,974 B2 | 3/2009 | Karstens | |
| 7,512,652 B1 | 3/2009 | Appelman et al. | |
| 7,822,821 B2 * | 10/2010 | Foote | 709/206 |
| 8,026,918 B1 * | 9/2011 | Murphy | 345/473 |
| 2002/0087679 A1 * | 7/2002 | Pulley et al. | 709/224 |
| 2003/0131055 A1 * | 7/2003 | Yashchin et al. | 709/204 |
| 2005/0076103 A1 * | 4/2005 | Hilf et al. | 709/220 |
| 2005/0165880 A1 | 7/2005 | Moody et al. | |
| 2006/0026233 A1 * | 2/2006 | Tenembaum et al. | 709/205 |
| 2007/0156851 A1 * | 7/2007 | Tasci | 709/219 |
| 2008/0021970 A1 | 1/2008 | Werndorfer et al. | |
| 2008/0262910 A1 * | 10/2008 | Altberg et al. | 705/14 |
| 2008/0263460 A1 * | 10/2008 | Altberg et al. | 715/757 |
| 2009/0164897 A1 * | 6/2009 | Amer-Yahia et al. | 715/703 |
| 2009/0259970 A1 * | 10/2009 | Hawkins | 715/810 |
| 2009/0319907 A1 * | 12/2009 | Tokuda | 715/739 |
| 2010/0083169 A1 * | 4/2010 | Athsani et al. | 715/810 |
| 2010/0180211 A1 * | 7/2010 | Boyd | 715/751 |
| 2010/0235758 A1 * | 9/2010 | Shen | 715/752 |

* cited by examiner

*Primary Examiner* — Omar Abdul-Ali
*Assistant Examiner* — Andrew Tank
(74) *Attorney, Agent, or Firm* — Hickman Palermo Truong Becker Bingham Wong LLP

(57) ABSTRACT

A system and method for resolving topically relevant contacts for a user is provided. One example embodiment provides for a method including acts of presenting, within a web page, a communication list with content that is presented to various user based at least in part on the users being associated with another user and the topical content of the web page. Another example embodiment provides or a system that serves web pages including a communication list with content that is presented to various users based at least in part on the user to user and user to topic associations.

29 Claims, 6 Drawing Sheets

SYSTEM AND METHOD FOR MAINTAINING CONTEXT SENSITIVE USER GROUPS

BACKGROUND

1. Field of the Invention

Aspects of the present inventions relate generally to Internet technologies, and more specifically, to internet based interpersonal communication.

2. Discussion of Related Art

Many users of the internet currently leverage various websites and software to establish and maintain personal and professional social networks. Some websites, such as LinkedIn, FaceBook and MySpace, provide users with facilities to publish information about themselves and review information about others. Embedded within these websites are various software applications that enable users to communicate with other users in a variety ways. For example, some of these websites provide users with email based communication applications. Other websites may provide for more immediate interactive communication via instant messaging and chatting technology.

Most of these websites provide users with the ability to maintain identification information for other users with whom they interact. Name and Address books are common, which often include information for establishing communication with other users via a variety of software applications. Lists of other instant messaging users are also often maintained in many instant messaging programs. These resources are a useful tool for users to maintain and build their personal and professional social networks.

SUMMARY OF THE INVENTION

According to one embodiment of the present invention, a topical communication system is provided that has the capability of presenting one or more contacts to a user based on the user's current topical context with the system. According to one aspect of the present invention, it is appreciated that individuals often maintain social networks that are specific to particular topics or activities. For example, individuals often have professional social networks, personal social networks, and topical social networks. Particular examples of topical social networks may include a wine tasting club, a religious congregation or a group of sports fans who enjoy tailgating before local games.

According to one embodiment, a method for facilitating communication among users of a website is provided. The website includes pages pertaining to a plurality of topics and the method includes acts of presenting a first page to a first user of the website, the first page pertaining to a first topic of the plurality of topics, receiving a first communication from the first user, determining at least one second user based at least in part on the first topic and presenting the first communication to the at least one second user.

In the method, the act of presenting the first communication may include an act of presenting a list of communications to the first user and the at least one second user. Furthermore, the act of presenting the first communication may include an act of presenting a list of communications that is operable to establish an interactive communication session between the first user and the at least one second user. Moreover, the act of determining at least one second user may include an act of determining at least one second user based at least in part on the expertise of the first user within the first topic.

In the method, the act of presenting the first communication may include an act of presenting a list of communications that is operable to post information on the list of communications, the posted information being viewable by the first user and the at least one second user. Still further, the act of presenting the list of communications that is operable to post information on the list of communications may include an act of presenting a list of communications that is operable to post information included on the first page. In addition, the method may include an act receiving an association between the first user and the at least one second user from the first user.

The method may further include an act of receiving an association between the at least one second user and the first topic from the at least one second user. Further, the method may include an act of determining an association between the first user and the at least one second user based at least in part on the first user's website usage and the at least one second user's website usage. Additionally, the method may include an act of determining an association between the at least one second user and the first topic of the plurality of topics based at least in part on the at least one second user's website usage. Other acts that may be present in the method include presenting a second page to the first user of the website, the second page pertaining to a second topic of the plurality of topics, receiving a second communication from the first user, determining at least one third user based at least in part on the second topic and presenting the second communication to the at least one third user.

According to another embodiment, a computer readable medium storing computer readable instructions is provided. According to this embodiment the instructions, as a result of being executed by a controller, instruct the controller to perform a method including acts of presenting a first page to a first user of the website, the first page pertaining to a first topic of the plurality of topics, receiving a first communication from the first user, determining at least one second user based at least in part on the first topic and presenting the first communication to the at least one second user.

According to another embodiment, a web server for facilitating communication among users of a website is provided. According to this embodiment, the web server includes a network interface and a controller coupled to the network interface and configured to serve, to a first user via the network interface, a plurality of pages. The plurality of pages may include a first page pertaining to a first topic, the first page comprising a first list of communications including at least one communication from at least one second user, the at least one second user associated with the first user and associated with the first topic and a second page pertaining to a second topic, the second page comprising a second list of communications including at least one communication from at least one third user, the at least one third user associated with the first user and associated with the second topic.

According to another embodiment, the first list of communications is operable to establish an interactive communication session between the first user and the at least one second user. Additionally, the first list of communications may be operable to initiate an email between the first user and the at least one second user. Moreover, the first list of communications may be operable to post information on the list of communications, the posted information being viewable by the first user and the at least one second user. Furthermore, the first list of communications may be operable to post information included on the website. In another embodiment, the controller is further configured to receive, from the first user via the network interface, an association between the first user and the at least one second user. The controller may be further configured to receive, from the at least one second user, an association between the at least one second user and the first topic. Further, the controller may be further configured to determining an association between the first user and the at least one second user based at least in part on the first user's website usage and the at least one second user's website usage. Moreover, the controller may be further configured to determine an association between the at least one second user and the first topic based at least in part on the at least one second user's website usage. Additionally, the controller may be further configured to receive, from the first user, a request to include the first list in a third web page and to serve the first list as part of the third web page.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
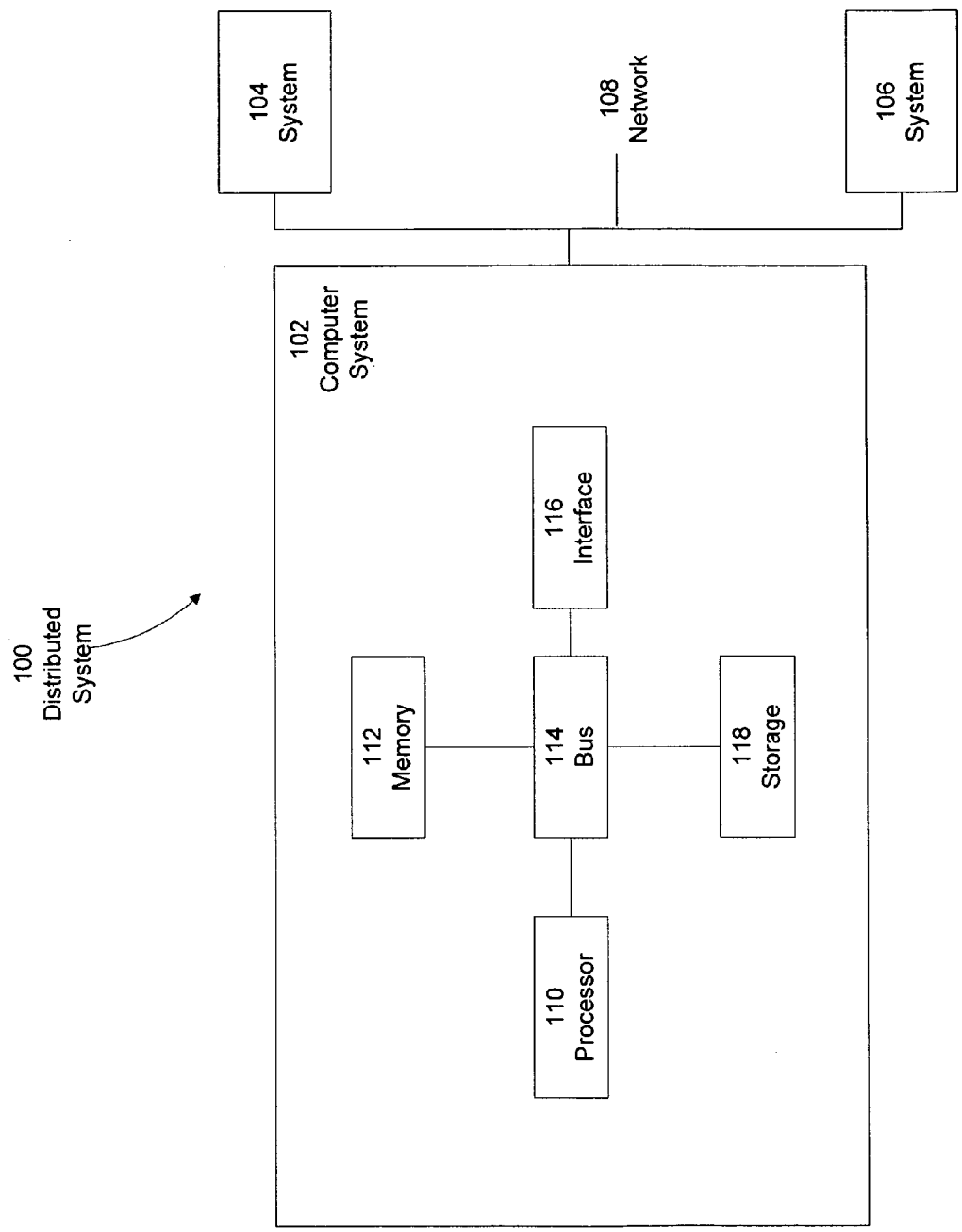
FIG. 1 shows an example computer system upon which various aspects of the present invention may be implemented.

As discussed above, one aspect of the present invention relates to a system that may present a user with one or more other users (contacts) based on the user's current topical context within the system. Furthermore, the interface presenting the contacts may provide one or more facilities to allow the user to communicate with one or more contacts. Thus a system in accord with the present invention allows the user to more efficiently find and communicate with contacts sharing topics of interest with the user.

Another aspect of the invention relates to a process for creating associations between users and topics. More specifically, a distributed process for creating an association between a user and a topic is provided that allows a user to explicitly designate that certain contacts be associated with certain topics. These associations may then be used by a system to present a user with contacts, and communications from contacts, according to topical context as expressly defined by the user.

Additionally, the system may determine an association based on an observed pattern of website usage. The pattern of system usage may involve the user and/or the contacts of the user. For example, the system may observe that a user frequently sends an email to another user while visiting a specific web page or web pages devoted to particular topics. The system may then establish, on behalf of the user, an association between the user, the topic and the contact. The system may ask for confirmation of associations or may simply add them for modification, as needed, by the user.

The aspects disclosed herein, which are in accord with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a general purpose computer system is configured to perform any of the functions described herein, including but not limited to, storing, editing, categorizing, and retrieving associations between topics, users and contracts of the user. However, such a system may also perform other functions, such as presenting messages to both the user and contacts of the user in a multi-participant interactive communication session. Thus the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

General Purpose Computer System

Various aspects and functions described herein in accord with the present invention may be implemented as hardware or software on one or more computer systems. These computer systems may be, for example, general purpose computers such as those based on Intel PENTIUM-type processor, Motorola PowerPC, AMD Athlon or Turion, Sun UltraSPARC, Hewlett-Packard PA-RISC processors, or any other type of processor and/or controller. Further, aspects may be located on a single computer or may be distributed among a plurality of computers attached by one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular distributed architecture, network, or communication protocol.

FIG. 1 shows a block diagram of a distributed computer system 100, in which various aspects and functions in accord with the present invention may be practiced. Distributed computer system 100 may include one more general purpose computer systems. For example, as illustrated, distributed computer system 100 includes general purpose computer systems 102, 104 and 106. As shown, computer systems 102, 104 and 106 are interconnected by, and may exchange data through, communication network 108. Network 108 may include any communication network through which computer systems may exchange data. To exchange data using network 108, computer system 102, 104 and 106 and network 108 may use various methods, protocols and standards known in the art, including, among others, token ring, ethernet, wireless ethernet, Bluetooth, TCP/IP, UDP, HTTP, FTP and SNMP. To ensure data transfer is secure, computer systems 102, 104 and 106 may transmit data via network 108 using a variety of security measures including TSL, SSL and/or VPN among other security techniques. While distributed computer system 100 illustrates three networked computer systems, distributed computer system 100 may include any number of computer systems and computing devices, networked using any medium and communication protocol.

Various aspects and functions in accord with the present invention may be implemented as specialized hardware or software executing in one or more computer systems including general purpose computer system 102 shown in FIG. 1. As depicted, computer system 102 includes processor 110, memory 112, bus 114, interface 116 and storage 118. Processor 110 typically performs a series of instructions resulting in data manipulation. Processor 110 is typically a commercially available processor such as an Intel Pentium, Motorola PowerPC, SGI MIPS, Sun UltraSPARC, or Hewlett-Packard PA-RISC processor, but may be any type of processor or controller as many other processors and controllers are available. Processor 110 is connected to other system elements, including one or more memory devices 112, by bus 114.

Memory 112 is typically used for storing programs and data during operation of computer system 102. Thus, memory 112 is often a relatively high performance, volatile, random access memory such as a dynamic random access memory (DRAM) or static memory (SRAM). However, memory 112 may include any device for storing data, such as a disk drive or other non-volatile storage device.

Components of computer system 102 may be coupled by an interconnection element such as bus 114. Typically, bus 114 includes one or more physical busses (e.g., between components that are integrated within a same machine), but may include any communication coupling between system elements including specialized and/or standard computing bus technologies such as IDE, SCSI, PCI and InfiniBand. Thus, bus 114 enables communications (e.g., data, instructions) to be exchanged between system components of computer system 102.

Computer system 102 also includes one or more interface devices 116 such as input devices, output devices and combination input/output devices. Interface devices may receive input and/or provide output. More particularly, output devices typically render information for external presentation. Input devices typically accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118, typically includes a computer readable and writeable nonvolatile storage recording medium in which instructions are stored that define a program to be executed by the processor or information stored on or in the medium to be processed by the program. More specifically, the information may be stored in one or more data structures specifically configured to conserve storage space and/or increase data exchange performance. The instructions may be persistently stored as encoded signals, and the instructions may cause a processor to perform any of the functions described herein. The medium may, for example, be optical disk, magnetic disk or flash memory, among others. Typically, in operation, the processor causes data to be read from the nonvolatile recording medium into another memory, such as memory 112, that allows for faster access to the information by the processor than does the storage medium included in storage system 118. The memory may be located in storage system 118 or in memory 112, however, processor 110 typically manipulates the data within the memory 112, and then copies the data to the medium associated with storage system 118 after processing is completed. A variety of components are known for managing data movement between the medium and integrated circuit memory element and the invention is not limited thereto. The invention is not limited to a particular memory system or storage system.

Although computer system 102 is shown by way of example as one type of computer system upon which various aspects and functions in accord with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation. While another embodiment may perform the same function using several general-purpose computing devices running MAC OS System X with Motorola PowerPC processors and several specialized computing devices running proprietary hardware and operating systems.

Computer system 102 may be a general purpose computer system including an operating system that manages at least a portion of the hardware elements included in computer system 102. Usually, a processor or controller, such as processor 110, executes an operating system which may be, for example, a Windows-based operating system (e.g., Windows NT, Windows 2000 (Windows ME), Windows XP operating systems) available from the Microsoft Corporation, a MAC OS System X operating system available from Apple Computer, one of many Linux-based operating system distributions (e.g., the Enterprise Linux operating system available from Red Hat Inc.), a Solaris operating system available from Sun Microsystems, or a UNIX operating systems available from various sources. Many other operating systems may be used, and embodiments are not limited to any particular implementation.

The processor and operating system together define a computer platform for which application programs in high-level programming languages are written. These component applications may be executable, intermediate (e.g., C−) or interpreted code which communicate over a communication network (e.g., the Internet) using a communication protocol (e.g., TCP/IP). Similarly, aspects in accord with the present invention may be implemented using an object-oriented programming language, such as SmallTalk, Java, C++, Ada, or C# (C-Sharp). Other object-oriented programming languages may also be used. Alternatively, functional, scripting, and/or logical programming languages may be used.

Additionally, various aspects and functions in accord with the present invention may be implemented in a non-programmed environment (e.g., documents created in HTML, XML or other format that, when viewed in a window of a browser program, render aspects of a graphical-user interface or perform other functions). Further, various embodiments in accord with the present invention may be implemented as programmed or non-programmed elements, or any combination thereof. For example, a web page may be implemented using a HTML while a data object called from within the web page may be written in C++. Thus, the invention is not limited to a specific programming language and any suitable programming languages could also be used.

A general-purpose computer system included within an embodiment may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of UPPSALA, Sweden and WebSphere middleware from IBM of Armonk, N.Y. However, a general purpose computer system running, for example, SQL Server may be able to support both aspects in accord with the present invention and databases for sundry applications not within the scope of the invention.

Example System Architecture

Figure 2:
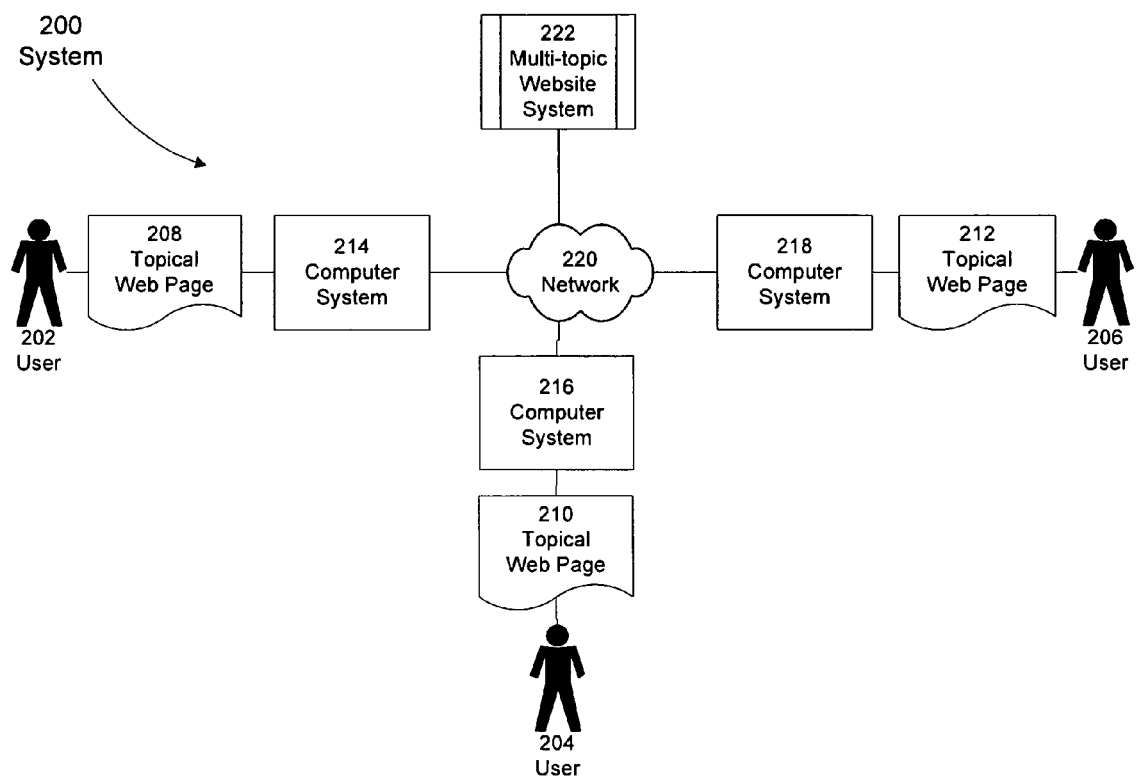
FIG. 2 shows an example distributed system according to one embodiment of the present invention.

FIG. 2 presents a context diagram of distributed system 200 specially configured to include an embodiment in accord of the present invention. Referring to FIG. 2, system 200 may allow website users 202, 204 and 206 to exchange information regarding various topics of interest using topical web pages 208, 210 and 212. According to this embodiment, topical web pages 208, 210 and 212 may be served by multi-topic website system 222 and may be rendered by computer systems 214, 216 and 218, respectively. Multi-topic website system 222 may support multiple topics through multiple topic focused web pages or properties. Computer systems 214, 216 and 218 may be interconnected with one another and website 222 via network 220. Network 220 may include any communication network through which member computer systems may exchange data.

The sundry computer systems shown in FIG. 2, which include computer systems 214, 216 and 218, network 220 and website system 222 each may include one or more general purpose computer systems. As discussed above with regard to FIG. 1, general purpose computer systems may have one or more processors or controllers, memory and interface devices. Also computer systems 214, 216 and 218 may include one or more mobile computing devices. Example mobile computing devices include cellular phones, personal digital assistants and other types of mobile computer systems. Moreover, computer systems 214, 216 and 218 and website system 222 may include any sort of general purpose computer system such as a personal computer, a workstation, a mainframe, a networked client, a server, media servers, application servers, database servers, web servers, load balancers, routers and switches. The particular configuration of system 200 depicted in FIG. 2 is used for illustration purposes only and embodiments of the invention may be practiced in other contexts.

Distributed system 200 may facilitate communication between multiple users according to aspects of the present invention. More particularly, users 202, 204 and 206 may review topical content, generate comments on the content and exchange both the comments and the topical content with other users. Further, website 222 may include various facilities for establishing associations between users, contacts and specific topics. These facilities may provide a user with varying degrees of automation when managing these associations.

According to one embodiment, website 222 may use associations between users, contacts and topics to promote communication among a social network of users. In this example, website 222 may serve, within web page 208, a context aware communicator. The context aware communicator may present one or more communications from contacts that are associated with both the user of a web page and the topical content of a web page. Additionally, in this embodiment, the context aware communicator may expose one or more interface elements that enable a user to share information with the contacts of the user. Thus, according to this embodiment, website 222 may provide user 202 with a facility to easily share topical information with contacts who share interest in the topic of web page 208.

In the illustrated embodiment, website 222 may also provide context aware communicators to users 204 and 206 within web pages 210 and 212. As with user 202 in regard to web page 208, users 204 and 206 may utilize the context aware communicators included in web pages 210 and 212 to share information with contacts associated with them and with the topical content of web pages 210 and 212. Website 222 may provide any information shared via the context aware communicators as part of web pages 208, 210 and 212. More particularly, website 222 may serve the shared information as part of a context aware communicator. In another embodiment, website 222 may serve shared information within portions of web pages 208, 210 and 212 other than a context aware communicator. Thus, distributed system 200 may enable information to be exchanged among members of a social network of users interested in a common topic.

To illustrate a specific example, user 202 may establish an association between himself and user 206 and between user 206 and the topic of soccer. Then user 202 may navigate to a web page 208 that addresses the soccer topic. Website 222 may serve, and computer system 214 may render, web page 208 including a context aware communicator and content directed toward soccer. The context aware communicator may present user 202 with communications from contacts associated with the topic of soccer, including communications from user 206. User 202 may review the soccer-related information, such as an article on user 202's favorite team, and may share the content, with or without annotation, with user 206 by using the context aware communicator to communicate the content.

Figure 3:
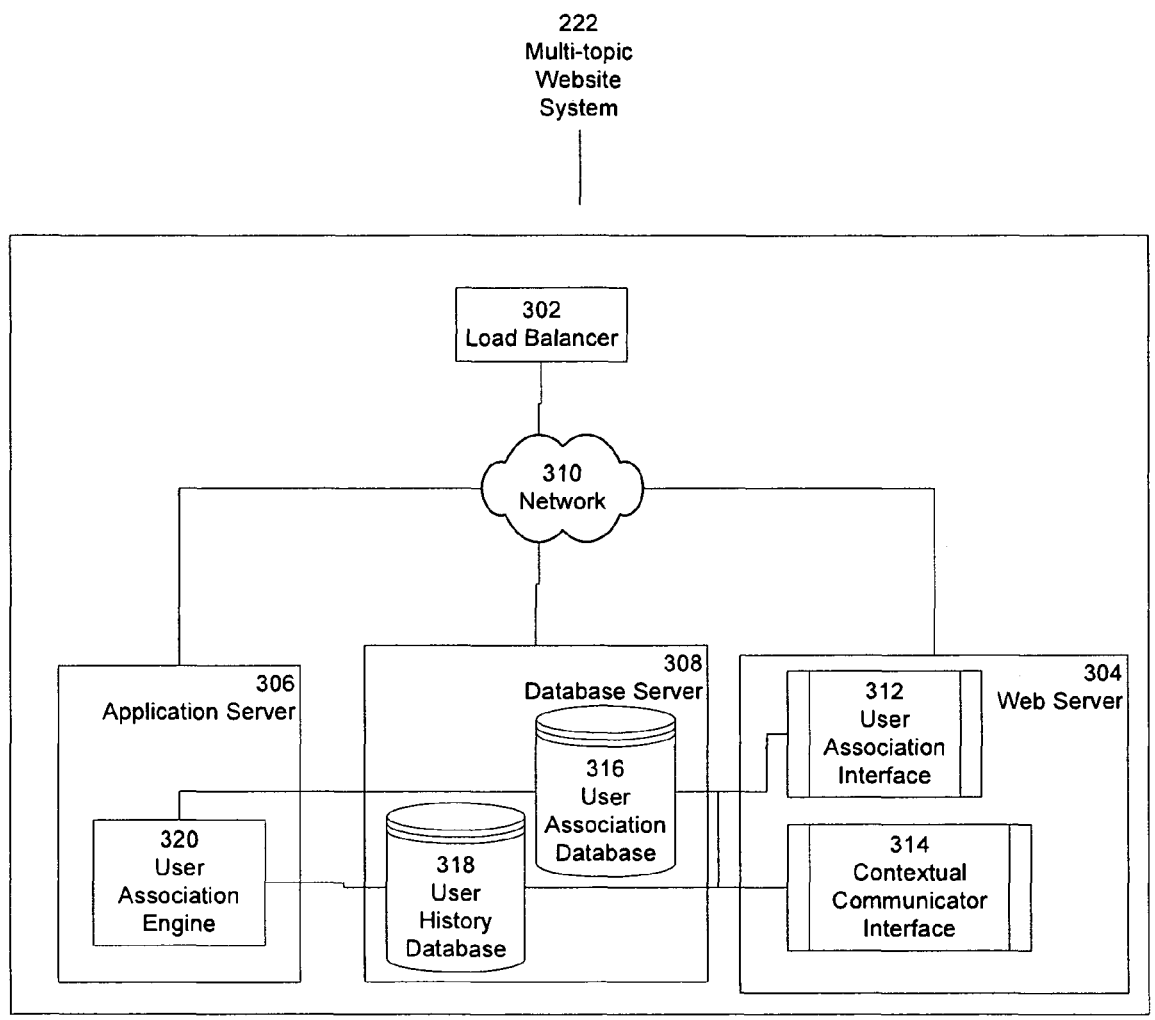
FIG. 3 shows an example physical and logical diagram for a website facilitating communication between a topical social network according to one embodiment of the present invention.

FIG. 3 provides a more detailed illustration of a particular physical and logical configuration of website 222 as a distributed system. The system structure and content recited below are for exemplary purposes only and is not intended to limit the invention to the specific structure shown in FIG. 3. As will be apparent to one of ordinary skill in the art, many variant system structures can be architected without deviating from the scope of the present invention. The particular arrangement presented in FIG. 3 was chosen to promote clarity.

Information may flow between the depicted elements, components and subsystems using any technique known in the art. Such techniques include passing the information over the network via TCP/IP, passing the information between modules in memory and passing the information by writing to a file, database, or some other non-volatile storage device. Other techniques and protocols may be used without departing from the scope of the invention.

In the embodiment illustrated in FIG. 3, website 222 includes five primary physical elements: load balancer 302, web server 304, application server 306, database server 308 and network 310. Each of these physical elements may include one or more general purpose computer systems as discussed with reference to FIG. 1 above. Further, in the illustrated embodiment, web server 304 includes two logical elements, user association interface 312 and contextual contact interface 314. Application server 306 includes one logical element, user association engine 320. Database server 308 includes two logical elements, user association database 316 and user history database 318.

In one embodiment, load balancer 302 may be any conventional load balancer as known to one of ordinary skill in the art and may provide load balancing services to the other elements of website 222. Network 310 may include any communication network through which member computer systems may exchange data. Web server 304, application server 306 and database server 308 may be, for example, one or more general purpose computer systems as described above with regard to FIG. 1. Typically, for a high volume website, web server 304, application server 306 and database server 308 will include multiple computer systems, but the invention is not limited to a specific number of computer systems. Web server 304 may serve content using any suitable protocol including, among others, HTML, DHTML, XML and PHP.

In the embodiment illustrated in FIG. 3, user association interface 312 may receive user association information, for example, information associating users to users or information associating users to topics, from external entities and may provide the user association information to user association database 316. Conversely, user association interface 312 may receive user association information from user association database 316 and may provide the user association information to external entities. Contextual communicator interface 314 may receive contact communication information, for example content for posting to a context aware communicator, from external entities and may receive contact identity information from user association database 316. Contextual communicator interface 314 may provide the contact communication information to the external entities. Contextual communicator interface 314 may also retrieve user history information from user history database 318. User association engine 320 may receive user history information from user history database 318 and may provide user association information to user association database 316. User association database 316 may include information indicating one or more users (contacts) that are associated with a particular user. User association database 316 may also include topics that are associated with each contact. User history database 318 may include information indicating website usage patterns of individual users. Specific usage information may include any information needed to determine user associations, such as for example, frequency and type of communications generated by a user, frequency of user visits to particular web pages and user generated content and demographic information associated with a user. Additionally, user history database 318 may include information regarding user expertise within particular topics. As discussed below, these demographics may allow some embodiments to partially or fully automate the creation of user to user and user to topic associations.

The databases 316 and 318 may take the form of any logical construction capable of storing information on a computer readable medium including flat files, indexed files, hierarchical databases, relational databases and/or object oriented databases. The data may be modeled using unique and foreign key relationships and indexes. The unique and foreign key relationships and indexes may be established between the various fields and tables to ensure both data integrity and data exchange performance.

According to one embodiment, user association interface 312 provides a user interface that enables a user to associate other users with himself, thus making those other users contacts of the user. User association interface 312 may also allow the user to associate topics with his contacts. User association interface 312 may store user created associations in user association database 316. Moreover, user association interface 312 may retrieve association information for review and modification by the user. A particular embodiment of user association interface 312 is discussed with further detail below.

According to another embodiment, contextual communicator interface 314 provides a user interface that enables a user to efficiently communicate with contacts belonging to a topically specific social network. The particular type of communication that may be facilitated by contextual communicator interface 314 includes, among others, email, interactive communication sessions (instant message/chat sessions) and posting of information to the members of the context aware communicator. Contextual communicator interface 314 may retrieve contact indicators for an indicated user and topic from user association database 316. Contextual communicator interface 314 may then use those indicators to send communications from the user to the user's contacts via topical web pages as discussed above. In an additional embodiment, contextual communicator interface 314 may also retrieve user history from user history database 318. Contextual communication interface 314 may use the user history to present past communication threads between users.

In another embodiment, contextual communicator interface 314 may be configured to interoperate with, or be included in, other systems. More particularly, in an embodiment, a user may include contextual communicator interface 314 in one or more web pages apart from the topical web pages discussed herein. For example, a user may include contextual communicator interface 314 in a web page describing the user's personal characteristics. A particular embodiment of contextual communicator interface 314, in which contextual communicator interface 314 provides a context aware communicator, is discussed with further detail below.

The user association interface 312 and the contextual communicator interface 314 each exchange information with various providers and consumers. These providers and consumers may include users and system interfaces. In the exemplary embodiment illustrated in FIG. 3, the users exchange information with both the user association interface 312 and the contextual communicator interface 314. In an alternative embodiment, this information may be exchanged with other applications or storage media using system interfaces exposed by each of these elements. Each of these elements may both restrict input to a predefined set of values and validate any information entered prior to using the information or providing the information to other components. These functions may prevent the introduction of erroneous data into the system.

According to another embodiment, user association engine 320 may scan user history database 318 for patterns from which associations between users and between users and topics may be discerned. Various embodiments may employ a variety of association rules that define under what circumstances associations should be established. In one embodiment, the user association engine 320 may determine an implied association between users based at least in part on the users communicating with a threshold degree of regularity. In another embodiment, the user association engine 320 may establish an implied association between users based the frequency with which one user reviews content posted by another user. In an additional embodiment, the user association engine 320 may record an association between users who have never interacted directly using the website, but that have similar website usage patterns, e.g. visiting similar pages, etc.

In another embodiment, user association engine 320 may find associations between users and topics. More specifically, user association engine 320 may establish an association between a user and a topic if the user visits pages including a particular topic. According to one example, if a user visits a soccer page more than 20 times in a month, user association engine 320 may establish an association between the user and the soccer topic.

In an additional embodiment, user association engine 320 may establish as association based on demographic or other information describing a user. For example user association engine 320 may establish an association between a user and a boating topic upon determining that the user recently purchased a new boat.

In another embodiment, user association engine 320 may establish an association based on the level of expertise of a particular user. More specifically, if a user has demonstrated a threshold level of expertise within a given topic, by for example receiving sufficient positive feedback for content generated by the user from other users interested in the topic, an association between that user and other users may be automatically established. Other basis for discerning associations exist and the invention is not limited to the steps of a particular pattern recognition process.

In an alternative embodiment, user association engine 320 may be configured to establish only a subset of the associations established under normal operation. For example, user association engine 320 may be configured to only establish user to user associations. In another example, user association engine 320 may be configured to only establish user to topic associations.

In yet another embodiment, user association engine 320 may be configured to establish associations using a restricted or modified set of association rules. For example, user association engine 320 may be configured to establish user to user associations based on modified communication thresholds, but not on the frequency that a user reviews the content of another. According to an embodiment, the configurable options of user association engine 320 may be presented to a user through a user interface.

After user association engine 320 discerns a user to user and/or a user to topic association, it may store the user association information in user association database 316. In one embodiment user association engine 320 may transmit an electronic notification, for example an email, to a user when a new association is created for the user. After these user associations are created, they may be modified or removed using user association interface 312. Thus some embodiments automate the creation of user associations, and assist a user in maintaining a set of topical social networks.

Relevant Contact Resolution

Figure 4:
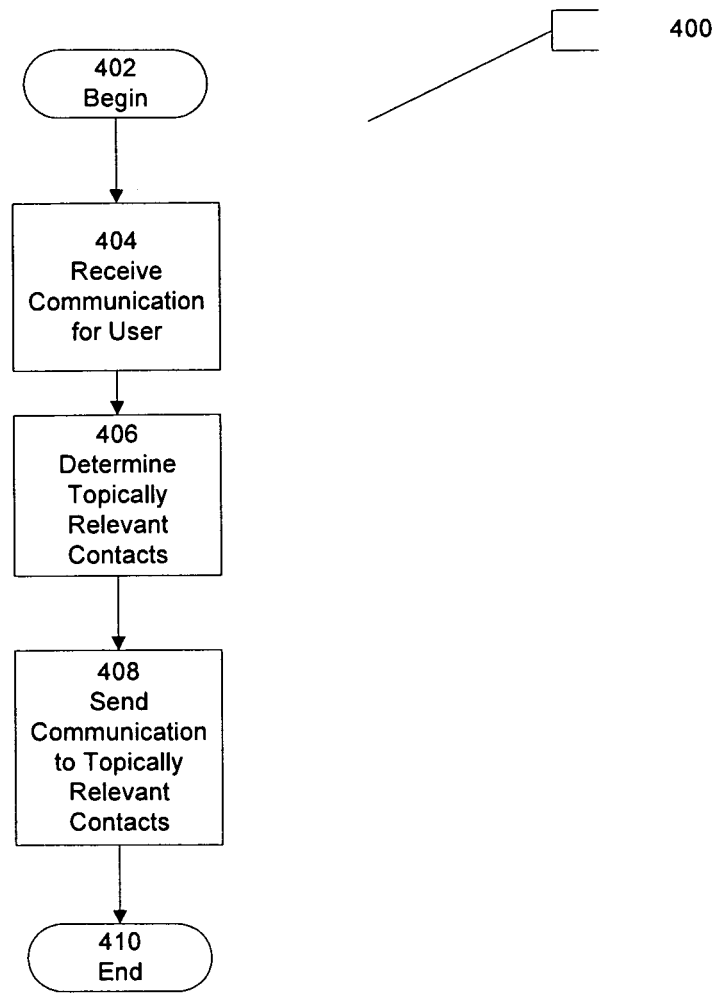
FIG. 4 show an example process for resolving topically relevant user contacts according to one embodiment of the present invention.

According to an embodiment, a system or system element, such as a contextual communicator interface 314, may supply communications from a user to a social network focused on a particular topic. FIG. 4 illustrates a process 400 of relaying messages between members of a topically focused social network. At block 402, process 400 begins. At block 404, a system may receive a communication from a user that is directed toward a set of topically relevant contacts. In one embodiment, the particular topic to which the communication is addressed may be determined by the web page from which the communication is submitted. This communication may include content expressed in various media including video, audio, text and photographs.

At block 406, a system may determine which contacts are topically relevant to the communication posted by the user. In one embodiment, the system may determine the topically relevant contacts by accessing a user association database, such as the user association database depicted in FIG. 3. For example, the system may query the user association database using a SQL query configured to retrieve indicators for all of the contacts of a user that are associated with the topic. The user association database may include indexes keyed on user and topic indicators to enable efficient retrieval of the contacts that are topically relevant to any posted communications.

At block 408, a system may send the communication to topically relevant contacts. In one embodiment, the system identifies context aware communicators associated with the topically relevant contacts and provides the communication to the identified context aware communicators. The context aware communicators, in turn, present the communications to the topically relevant contacts.

At block 410, process 400 ends. Thus, a system executing process 400 allows a user to seamlessly communicate with a topical social network while reviewing content associated with the pertinent topic. Moreover, a system executing process 400 may determine the membership of the topical social network based at least in part on the web page that the user is viewing.

Process 400 depicts one particular sequence of acts in a particular embodiment. Other actions can be added, or the order of actions can be altered in this method without departing from the scope of the present invention.

Example User Interface

Figure 5:
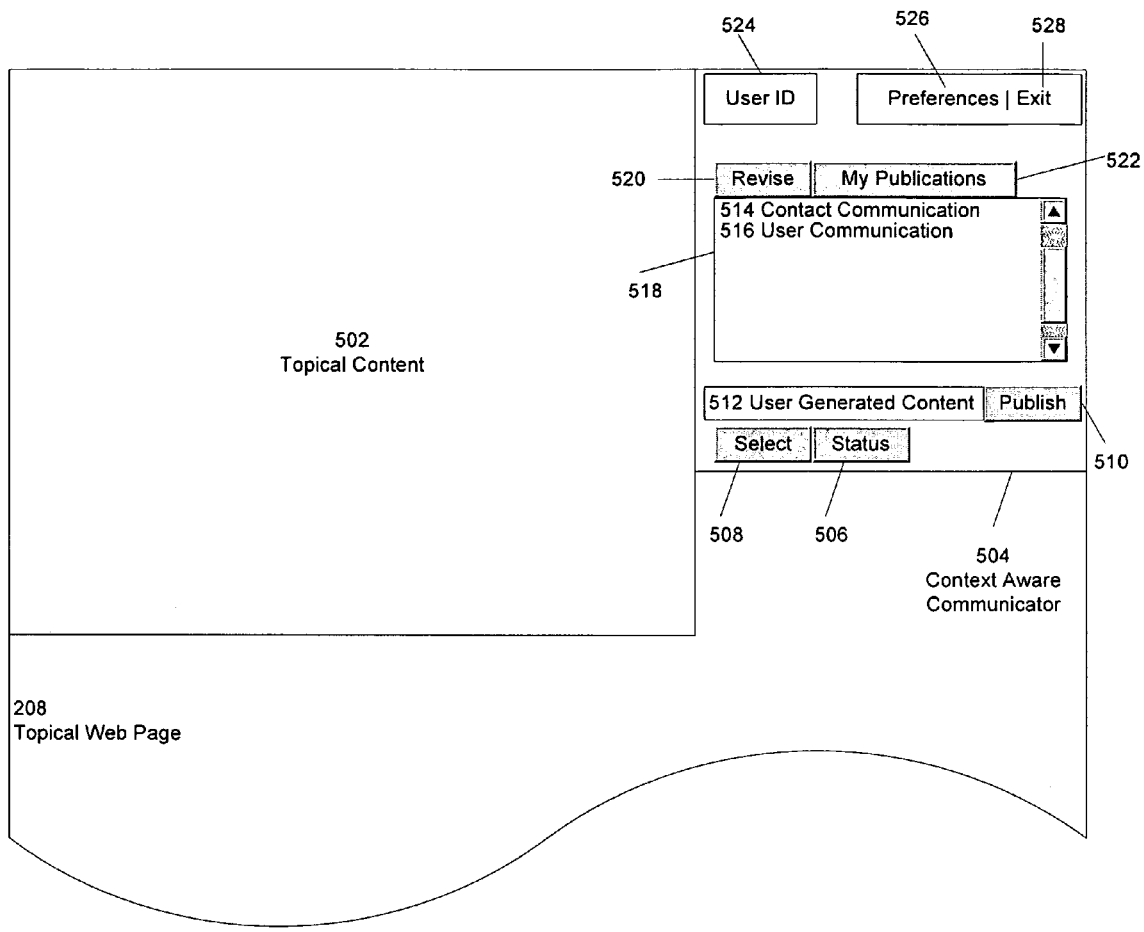
FIG. 5 shows an example interface through which a user may communicate with a topical social network according to one embodiment of the present invention.

FIG. 5 illustrates one embodiment of topical web page 208 and associated user interface elements. According to the depicted embodiment, web page 208 may include topical content section 502 and context aware communicator 504. Context aware communicator 504 may include status element 506, select element 508, publish element 510, user generate content element 512, communication elements 514 and 516, communicator element 518, revise element 520, my publications element 522, user id element 524, preferences element 526 and exit element 528.

Topical content element 502 may present a variety of topical content associated with web page 208 to a user. This content may include, among other examples, articles, news items, video, audio, photographs, Uniform Resource Locators (URLs) to other locations containing topical content, etc. According to one embodiment, topical content element may also present user generated content, such as content created through the use of context aware communicator 504.

Context aware communicator 504 may allow a user to more efficiently communicate with a topical social network. In one embodiment, context aware communicator 504 acts as a multi-party interactive communication session with the user and the contacts of the user being able to post content to the session for all other session members to review via a context aware communicator associated with the member user. The user interface elements of context aware communicator 504 may function as follows.

When status element 506 is actuated, context aware communicator 504 may allow the user to select a current status indicator that will be presented to other users. For example, the status indicator may indicate that the user is available, unavailable, busy, off-line, online, a custom status etc. Additionally, the status indicator may be included in communications the user sends to his contacts via the context aware communicator 504. The status indicator may indicate status by communicating using any type of media including, among others, emoticons, graphics, text, audio and video. In at least one embodiment, the initial state of the status indicator may be set by the system and later changed by the user.

When select element 508 is actuated, context aware communicator 504 may allow the user to select a particular type of content to be communicated. In one embodiment, the types of content supported by context aware communicator 504 may include videos, photos and URLs, but other types of content may be supported by other embodiments. When publish element 510 is actuated, the content included in user generated content 512 may be published to the topically relevant contacts of the user.

According to one embodiment, published content is presented to each topically relevant contact within a context aware communicator corresponding to each contact. Additionally, the published content may appear in communicator element 518 as a user communication element 516. When user communication element 516 is selected and revise element 520 is actuated, the user may modify communication element 516. The modifications that the user may perform on communication element 516 include changing or removing communication element 516. The modification may apply to all context aware communicators in which the communication element 516 is displayed.

In another embodiment, contact communication element 514 may have been posted by a contact of the user via the context aware communicator corresponding to the contact. Communication element 514 may present an indicator of the contact, the current status of the contact and at least a portion of the latest content communicated by the contact to their contacts. Additionally, in some embodiments, actuating a communicator element may result in various system behaviors including emailing the contact, opening an instant message chat session with the contact or displaying the contact's profile information.

When my publications element 522 is selected, communicator element 518 may display on those communication elements that the user has published. When user id element 524 is actuated, the system may present the user with his profile for review and modification. When preferences element 526 is actuated, the system may provide a configuration interface for context aware communicator 504. This configuration interface may allow the user to configure the behavior of context aware communicator 504. For example, in one embodiment, the user may configure the context ware communicator 504 to maintain a persistent list of contacts as the user navigates multiple web pages that address different topics. Moreover, the configuration interface may include a user association interface as discussed further below. When exit element 528 is actuated, the system may close context aware communicator 504. FIG. 5 thus presents one embodiment in which a user can easily exchange information with a topical social network.

Figure 6:
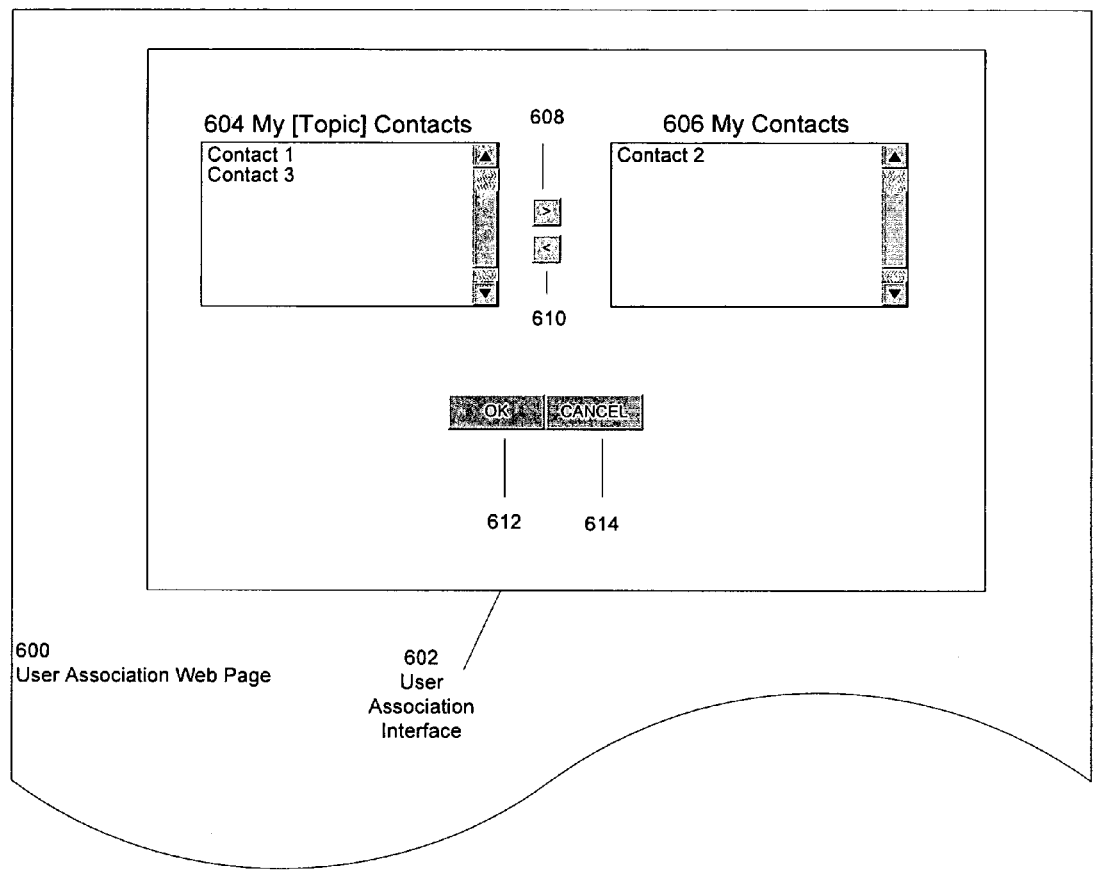
FIG. 6 shows an example interface through which a user may configure association between contacts and topics according to one embodiment of the present invention.

FIG. 6 illustrates a user association web page 600 that may include a user association interface 602, topically relevant contacts list 604, unassigned contacts list 606, list selection elements 608 and 610, an ok element 612 and a cancel element 614.

These user interface elements of the user association web page 600 may function as follows. To select a particular contact to associate a topic, the user may select the particular contact in the unassigned contacts list 606 and actuate list selection element 610. When list selection element 610 is actuated, the currently selected contact in unassigned contacts list 606 will be associated with the topic and will be displayed in the topically relevant contacts list 604. Alternatively, the user may disassociate the contacts currently selected in the topically relevant contacts list 604 by actuating list selection element 608. The user may save his changes by actuating the ok element 612 or may cancel his changes by actuating the cancel element 614. FIG. 6 presents an efficient inference that may be used to associate user contacts with specific topics.

Having now described some illustrative aspects of the invention, it should be apparent to those skilled in the art that the foregoing is merely illustrative and not limiting, having been presented by way of example only. While the bulk of this disclosure is focused on embodiments including a context aware communicator that posts content to a multi-party interactive communication session, other interface elements may be employed to forward content to user contacts in accordance to the present invention. For example, according to one embodiment, a system may distribute content to a topical social network via one way broadcast. Similarly, aspects of the present invention may be used to achieve other objectives including allowing near real-time auctioneer to update a group of bidders as to the current high bid on a particular auction item. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. A method for facilitating communication among users, the method comprising:
prior to selecting a particular second user with whom to establish an interactive communication session with a first user relative to a first topic, receiving content to be published from the first user, wherein the content to be published includes one or more of a video, audio, text or a photograph;
in response to receiving the content to be published from the first user:
determining that the content received from the first user relates to the first topic, and
selecting the particular second user for receiving the content based at least in part on an association between the particular second user and the first topic;
wherein the association between the particular second user and the first topic is established based on at least one of:
(a) an association, created by the first user before the content to be published is received from the first user, between the particular second user and the first topic;
(b) the particular second user's observed pattern of website usage, wherein the pattern is detected as a result of observing multiple instances of website usage by the particular second user; or (c) information, gathered by a website in relation to posts of the particular second user, that reflects a level of expertise of the particular second user within the first topic; and in response to said selecting, presenting the content to the particular second user;

wherein the method is performed by one or more computing devices.

2. The method according to claim 1, wherein presenting the content includes presenting a list of content to the first user and the particular second user.

3. The method according to claim 1, wherein:
presenting the content includes presenting the content as a communication in a list of communications in a user interface;
the user interface enables the interactive communication session to be established between the first user and the particular second user.

4. The method according to claim 1, wherein:
presenting the content includes presenting a list of communications in a user interface;
the user interface posts the content as a communication on the list of communications, and
the posted content is viewable by the first user and the particular second user.

5. The method according to claim 4, wherein the user interface includes a control that enables posting, to other users, information selected from a first web page.

6. The method according to claim 1, further comprising:
receiving a particular association between the first user and the particular second user from the first user; and
selecting the particular second user for receiving the content based on said particular association.

7. The method according to claim 1, further comprising receiving an association between the particular second user and the first topic from the particular second user.

8. The method according to claim 1, further comprising determining an association between the first user and the particular second user based at least in part on the first user's website usage and the particular second user's website usage.

9. The method according to claim 1, further comprising:
receiving second content to be published from the first user;
in response to receiving the second content to be published from the first user:
determining that the second content received from the first user relates to a second topic;
selecting a particular third user for receiving the second content based at least in part on an association between the particular third user and the second topic; and
in response to selecting the particular third user for receiving the second content, presenting the second content to the third user.

10. The method according to claim 1, wherein the association between the particular second user and the first topic is established based on an association, created by the first user before the content is received from the first user, between the particular second user and the first topic.

11. The method according to claim 1, wherein the association between the particular second user and the first topic is established based on the particular second user's observed pattern of website usage, wherein the pattern is detected as a result of observing multiple instances of website usage by the particular second user.

12. The method according to claim 1, wherein the association between the particular second user and the first topic is established based on information, gathered by a website in relation to posts of the particular second user, that reflects a level of expertise of the particular second user within the first topic.

13. The method according to claim 1, wherein the method further comprises:
prior to receiving the content from the first user, presenting a first web page of the website to the first user;
wherein the step of receiving the content involves receiving a submission of the content, from the first user, through said first web page; and
determining that the content received from the first user relates to the first topic based on a determination that the first web page relates to the first topic.

14. The method according to claim 1, wherein the level of expertise of the particular second user is established based, at least in part, on feedback for content generated by the particular second user.

15. A computer readable medium storing computer readable instructions that, as a result of being executed by a controller, instruct the controller to perform a method comprising:
prior to selecting a particular second user with whom to establish an interactive communication session with the first user relative to a first topic, receiving content to be published from a first user, wherein the content to be published includes one or more of a video, audio, text or a photograph;
in response to receiving the content to be published from the first user:
determining that the content received from the first user relates to the first topic;
selecting the particular second user for receiving the content based at least in part on an association between the particular second user and the first topic;
wherein the association between the particular second user and the first topic is established based on at least one of:
(a) an association, created by the first user before the content to be published is received from the first user, between the particular second user and the first topic;
(b) the particular second user's observed pattern of website usage, wherein the pattern is detected as a result of observing multiple instances of website usage by the particular second user; or
(c) information, gathered by a website in relation to posts of the particular second user, that reflects a level of expertise of the particular second user within the first topic; and
in response to said selecting, presenting the content to the particular second user.

16. A web server for facilitating communication among users, the web server comprising:
a network interface; and
a controller coupled to the network interface;
the controller configured to perform:
prior to selecting a particular second user with whom to establish an interactive communication session with the first user relative to a first topic, receiving content to be published from a first user, wherein the content to be published includes one or more of a video, audio, text or a photograph;
in response to receiving the content to be published from the first user:
determining that the content received from the first user relates to the first topic;

selecting the particular second user for receiving the content based at least in part on an association between the particular second user and the first topic;
wherein the association between the particular second user and the first topic is established based on at least one of:
  (a) an association, created by the first user before the content to be published is received from the first user, between the particular second user and the first topic;
  (b) the particular second user's observed pattern of website usage, wherein the pattern is detected as a result of observing multiple instances of website usage by the particular second user; or
  (c) information, gathered by a website in relation to posts of the particular second user, that reflects a level of expertise of the particular second user within the first topic; and
in response to said selecting, presenting the content to the particular second user.

17. The web server according to claim 16, wherein:
presenting the content includes presenting the content as a communication in a user interface;
the user interface enables the interactive communication session to be established between the first user and the particular second user.

18. The web server according to claim 16, wherein:
presenting the content includes presenting the content as a communication in a user interface;
the user interface includes a control that enables initiating an email between the first user and the particular second user.

19. The web server according to claim 16, wherein:
presenting the content includes presenting a list of communications in a user interface;
the user interface posts the content as a communication on the list of communications, and the posted content is viewable by the first user and the particular second user.

20. The web server according to claim 19, wherein the user interface includes a control that enables posting, to other users, information selected from a first web page.

21. The web server according to claim 16, wherein the controller is further configured to receive, from the first user via the network interface, an association between the first user and the particular second user.

22. The web server according to claim 16, wherein the controller is further configured to receive, from the particular second user, an association between the particular second user and the first topic.

23. The web server according to claim 16, wherein the controller is configured to determining an association between the first user and the particular second user based at least in part on the first user's website usage and the particular second user's website usage.

24. The web server according to claim 16, wherein the controller is further configured to receive, from the first user, a request to include the content in a third web page and to serve the content as part of the third web page.

25. The web server according to claim 16, wherein the association between the particular second user and the first topic is established based on an association, created by the first user before the content is received from the first user, between the particular second user and the first topic.

26. The web server according to claim 16, wherein the association between the particular second user and the first topic is established based on the particular second user's observed pattern of website usage, wherein the pattern is detected as a result of observing multiple instances of website usage by the particular second user.

27. The web server according to claim 16, wherein the association between the particular second user and the first topic is established based on information, gathered by a website in relation to posts of the particular second user, that reflects a level of expertise of the particular second user within the first topic.

28. The web server according to claim 16, wherein the controller is further configured to perform:
  prior to receiving the content from the first user, presenting a first web page of the website to the first user; and
  determining that the content received from the first user relates to the first topic based on a determination that the first web page relates to the first topic.

29. The web server according to claim 16, wherein the level of expertise of the particular second user is established based, at least in part, on feedback for content generated by the particular second user.

* * * * *